SUSPENSION SYSTEMS FOR PHONOGRAPH PICKUPS

Filed Dec. 5, 1962 2 Sheets-Sheet 1

INVENTORS
DALLAS R. ANDREWS
JOHN A. TOURTELLOT
BY Eugene M. Whitacre
ATTORNEY

SUSPENSION SYSTEMS FOR PHONOGRAPH PICKUPS
Filed Dec. 5, 1962 2 Sheets-Sheet 2
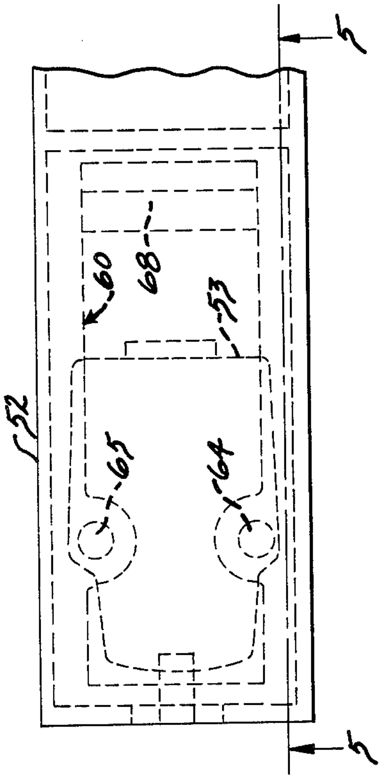
FIG. 4.
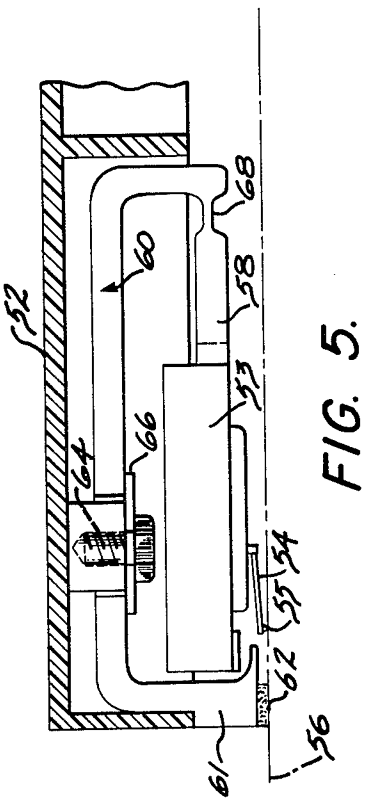
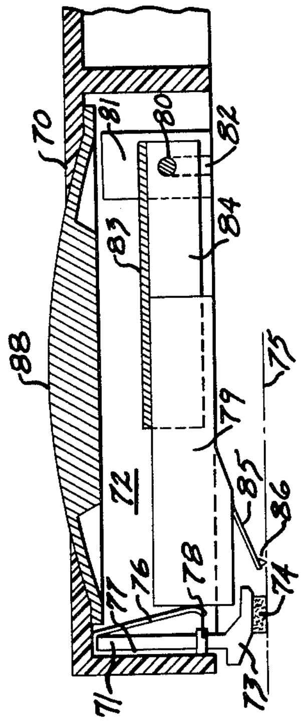
FIG. 6.
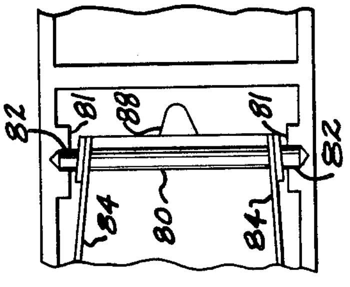
FIG. 7.
INVENTORS
DALLAS R. ANDREWS
JOHN A. TOURTELLOT
BY Eugene M. Whitacre
ATTORNEY United States Patent Office 3,228,700 Patented Jan. 11, 1966

3,228,700
SUSPENSION SYSTEMS FOR PHONOGRAPH PICKUPS

Dallas R. Andrews and John A. Tourtellot, Indianapolis, Ind., assignors to Radio Corporation of America, a corporation of Delaware Filed Dec. 5, 1962, Ser. No. 242,427
2 Claims. (Cl. 274—23)

The present invention relates to phonographs and like record playing equipment, and more particularly to tone-arm and like suspension systems for pickups or pickup devices in phonograph record playing equipment.

Modern phonograph record playing equipment employs lightweight low-mass electric pickup devices for translating the sound recording in a record groove into corresponding electrical signals which are amplified and reproduced as sound. A pivoted tone arm is used to carry and guide the pickup on the record at a desired angle and with a vertical force or downward pressure for proper tracking of the pickup stylus in the groove.

The tracking force should be substantially constant and is generally provided by vertically counter-balancing the tone arm about the vertical pivot axis thereof with weights or springs, or a combination of both. Friction in the pivot means, however, adds to and subtracts from the tracking force or pressure on the stylus as the tone arm is caused to move vertically on a warped record, and thus may introduce distortion in the sound translation and reproduction.

If, as has heretofore been proposed, the tone arm is mounted to swing at a fixed height above the turntable with which it is associated, and the pickup is then pivoted for vertical movement within the tone arm, several other difficulties are encountered. The shorter radius from the stylus to the pivot means for the pickup, causes more longitudinal motion of the stylus in the groove, which produces more distortion or "wow" or warped records. In addition, the fixed height of the tone arm means is not adapted for many different numbers of records on the turntable stack, as occurs with record changers, for example.

It is, therefore, an object of this invention, to provide an improved tone-arm means and suspension system for pickups or pickup devices in record players, record changers, and other phonograph record playing equipment, which obviates the above and other operational difficulties heretofore inherent in equipments of that type.

It is also an object of this invention, to provide an improved suspension system for phonograph pickups and pickup devices in tone arms for record players, record changers and the like which provides improved tracking with warped records and with limited stylus force and record wear in operation, thereby to reduce distortion in sound translation and reproduction therefrom.

It is still a further object of this invention, to provide an improved tone arm construction and mounting system for ready application in phonograph record changers, record players and the like, which provides for unitary movement of the tone arm and pickup on warped records while permitting the pickup to be independently movable with respect to the tone arm in operation, thereby to follow the record groove for improved sound translation therefrom.

In accordance with the invention, in a phonograph record player or record changer, a rearwardly pivoted tone arm movable on horizontal and vertical pivot axes in the usual manner, is made to rest at the forward or free end thereof in fixed relation to and on the top record surface. The pickup however is pivoted in the tone arm to move vertically independently thereof, but in connection therewith, to engage the stylus in the groove of the record being played. Limit stop means may be provided for determining the range of vertical movement of the pickup on its pivot axis.

With this construction, undulations in the record surface, due to warpage for example, do not essentially alter the spaced relation of the pickup pivot and the stylus tip in the vertical direction. This relation thus remains practically constant as the pickup stylus follows the groove in playing a record. The pickup does not pivot or move vertically appreciably relative to the tone arm. The stylus tip and the pivot axis of the pickup in the tone arm thus move substantially together vertically in response to variations in the record surface in the vertical direction. A minimum of longitudinal movement along the record groove is thus imparted to the stylus tip, as is desirable for reducing wow and distortion effects in the record translation and reproduction to a minimum.

Friction in the pivot means of the tone arm, with prior proposed constructions adds to and subtracts from the vertical stylus pressure or force as the tone arm moves vertically on a warped record. By resting the free end of the tone arm on the record surface and pivoting the pickup therein for independent vertical movement at the stylus tip, friction at the pivot axis for vertical movement can be reduced to a minimum, because the pickup per se and its associated suspension elements can be extremely light in weight and low in mass. A much more constant vertical force is thus provided on the pickup stylus tip, whether spring or gravity, or a combination loading, is applied to the pickup. The substantially constant vertical pressure effect provides improved sound translation and tends to effectively reduce intermodulation distortion.

Several different pivot means may be used in this tone arm and suspension system, such as needle point bearings, knife-edge bearings, straight pin-hinge type bearings, and flexible metallic or plastic web hinge means. However it is desirable that such pivot means provide substantially no back lash in operation, and relatively low friction or loading.

Further in this construction, the pickup itself tracks the groove and provides the force which controls the movement of the tone arm toward the center of the record, with the weight of the arm supported by a relatively stiff depending front-end bracket or support element having a lower end or foot of limited area engaging and sliding on the record surface, with the pickup and arm in the record playing position. The foot of the bracket or supporting element may be padded to provide a smooth sliding action and to prevent scratching of the record surface.

The invention will however be further understood from the following description of certain embodiments thereof when considered in connection with the accompanying drawings, and its scope is pointed out in the appended claims.

In the drawings, FIGURE 1 is a top view, in perspective of a phonograph record changer, representing any suitable record playing apparatus, and provided with a tone arm means and pickup suspension system embodying the invention;

FIGURES 4 and 5 are top and sectional side views respectively of a further modification of the invention as applied to the tone arm of record playing equipment;

Figure 1:
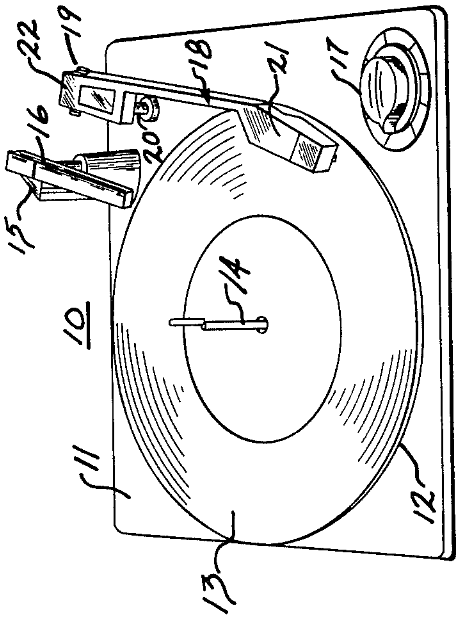

FIGURE 5 being a sectional side view taken on the section line 5—5 of FIGURE 4;

FIGURE 6 is a similar sectional side view of a further modification of the invention as applied to the tone arm of the record changer shown in FIGURE 1, for commercial use, and FIGURE 7 is fragmentary bottom view of the tone arm means of FIGURE 6, further showing a detail of construction thereof.

Figure 2:
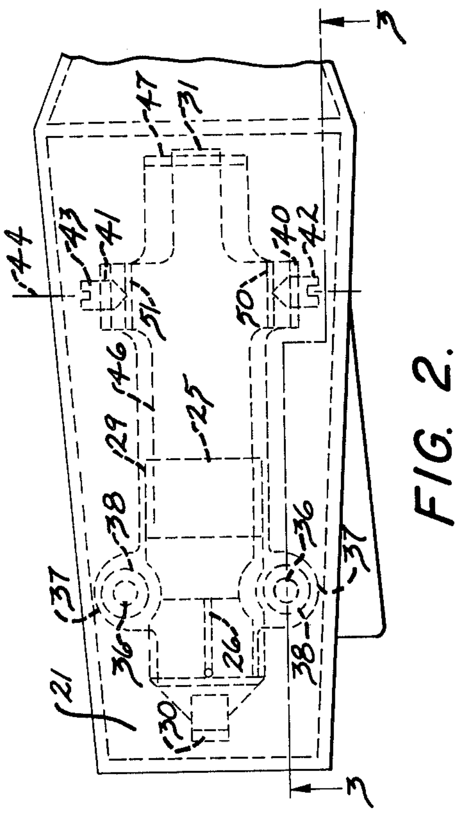
FIGURE 2 is an enlarged top view of the forward or pickup end of the tone arm means of FIGURE 1, showing details of construction of the pickup suspension system in accordance with the invention.
Figure 3:
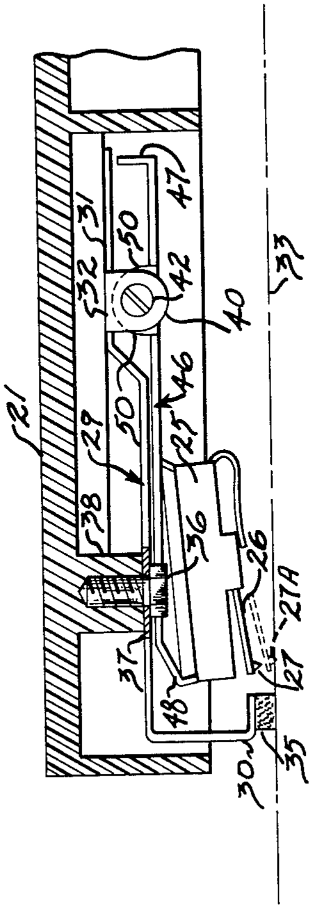
FIGURE 3 is a side view, in elevation, of the portion of the tone arm and pickup suspension system shown in FIGURE 2, taken on the section line 3—3 thereof, and showing further details of construction in accordance with the invention.

Referring to the drawings wherein like reference numerals are applied to like elements and parts throughout the various figures, and referring particularly to FIGURES 1, 2 and 3, a record changer 10, representing any suitable phonograph record playing equipment for which the invention is adapted, is provided with a motor board or turntable base 11 on which is mounted the usual motor driven turntable 12. A record 13 is located on the turntable in the playing position on the central turntable spindle 14, which may be of the manual-play type or the automatic-release type. As the latter, it is equipped to handle a stack of records in playing sequence by release onto the turntable in the usual manner under control of stabilizing and last-record stop elements carried by a control pedestal 15 and including a stabilizing and control arm 16. The arm 16 is broken away at its forward end to slow the record and turntable arrangement more clearly, as it does not concern the present invention. The record changer is further provided with a control knob and control elements contained in a unit 17 mounted on the base for operation in any suitable manner as required for the apparatus concerned.

The record changer also is provided with a tone arm 18 which is pivotally mounted at its rear end on a "vertical" pivot axis provided in connection with a horizontal pivot pin 19, and a "horizontal" or "lateral" pivot axis, provided in connection with a vertical pivot pin 20, in the usual manner for vertical and lateral pivotal movement at its free or forward end with respect to, and over, the record playing surface. As is understood, therefore, the axis represented by the pin 19 is the vertical axis of movement for the tone arm, and the axis represented by the pin 20 is the horizontal axis of movement for the tone arm, and will hereinafter be so referred to.

The forward or free end 21 of the tone arm carries or contains the pickup device or cartridge, and its weight is normally counterbalanced by suitable balance weight or like means provided in connection with the rear end 22 of the tone-arm structure and on the opposite side of the pivot pin or axis 19 from the pickup end. By this construction, the weight of the tone arm, that is, the downward pressure or force of the forward end of the tone arm may be regulated, as is understood.

A pivoted tone arm, laterally and vertically movable at its free end, is thus provided for carrying and guiding a pickup or pickup device 25 on the record at a desired angle and with a vertical force or downward pressure for proper tracking of the pickup stylus 26 in the record groove. As in the present example, the pickup or pickup device 25 may be of any suitable construction such as a cartridge, having a body or casing adapted to be mounted in a tone arm structure, and positioned with the stylus extending therefrom, and provided with a stylus tip 27 for engaging the record groove with the tone arm in the playing position.

Unlike the usual tone-arm mounting means, the pickup is not connected fixedly in the arm and does not receive any appreciable downward force or pressure therefrom at the stylus and stylus tip. Instead, the tone arm has mounted thereon a tone-arm support or bracket element 29 having an outer end 30 extending therefrom to engage and rest on the upper surface of the playing record on the turntable. This may be a single record as shown, or the top record of a stack on the turntable, as is understood.

The tone arm structure or system further includes an inner hinge section or pivot 32 to which the pickup device 25 is connected for pivotal movement with respect thereto, toward and away from the record surface in a vertical direction or plane at the stylus or stylus tip. In the present embodiment, the inner pivot 32 for the pickup device is provided in connection with an inner portion 31 of the tone-arm support or bracket element 29, as a simplified construction. As viewed in FIGURE 3, the stylus is shown withdrawn from the record surface indicated by the dot-and-dash line 33, whereas it normally assumes the lower, playing, position indicated by the dotted out-line 27A.

The outer end 30 of the bracket element extends downwardly from the arm, as indicated more clearly in FIGURE 3, to a foot or pad element 35 of soft material which slidably engages the record surface in operation. Thus the weight of the free end of tone-arm means or structure is taken entirely by the bracket element as it rests or rides freely and smoothly on the record surface in operation. The stylus is thus free of the vertical pressure normally required to support the tone-arm and can, therefore, respond more faithfully to the record groove modulation or recording, and particularly stereophonic recordings which have both vertical and lateral sound components.

In the present example, the bracket element 29 is in the form of a thin metallic strip shaped to conform to the tone-arm interior and secured therein by any suitable means, such as two bolts 36. The bolts 36 are arranged to pass through spaced ears 37 to hold the bracket element in contact with two integral bosses 38 provided in the tone arm, which may be of molded plastic material. The bolts are threaded into the bosses centrally thereof as indicated, although any other suitable mounting means may be provided for holding the bracket element in place in any particular tone arm structure.

In the present example, the tone-arm bracket element 29 includes, at the pivot or hinge section 32, a pair of spaced downwardly extending ears 40 and 41, through which are threaded, respectively, opposed pivot screws 42 and 43, on a common pivot axis 44 for movement of the pickup device 25 in the arm. The pickup in the present example is connected with the pivot axis, and the pivot screws 42 and 43, through a pickup bracket comprising a second metallic strip 46 having an upturned inner stop end 47 and a forward end 48 adapted to receive and hold the pickup by its outer casing in any suitable manner, as by a snap-in fit as indicated. Intermediate between the forward and rear ends, and in alignment with the pivot axis 44, the pickup bracket 46 is provided with two upturned integral ears 50 and 51 which are engaged by the pivot ends of the screws 42 and 43, respectively, to complete the pivot or hinge connection for the pickup device with the tone arm and tone arm bracket.

In operation, the pivot or hinge section 32 permits the pickup and mounting means, or pickup bracket assembly to pivot or move vertically downwardly, or fall by gravity, until the stylus tip 27 engages in the record groove, when the tone arm is in the playing position 95 indicated in FIGURE 1. The foot or lower end of the tone-arm bracket element receives the weight of the tone arm and the bracket element as it rides smoothly on the record, Due to the light construction of modern pickup devices, such as the type indicated, the weight of the pickup assembly, comprising the bracket element 46 and the pickup device 25, may be made relatively low and to provide a tracking force or pressure below 5 grams as referred to stylus tip. The pressure on the tone-arm foot or pad 25 can be set by the counterweight 22 at the rear end of the tone arm, or by a choice of materials, or by other means such as spring elements commonly used, and thus may be made to fall below a value, for example, of 8–10 grams. The resilient pad or foot for the tone arm supports the tone arm and rotation of the record produces a radial force tending to move the tone arm toward the center of the record. However this radial force which is a function of the pressure in the resilient pad, the pad area, the position of the tone arm over the record, etc., is adjusted so that its maximum value is sufficiently low that the radial forces arising from the engagement of the stylus with the record groove controls the movement of the tone arm toward the center of the record. In other words the radial force imparted to the tone arm by the resilient pad must be kept low enough to prevent the stylus from riding over the groove wall toward the center of the record, and thereby prevent groove skipping.

Referring now to the modification shown in FIGURES 4 and 5, as applied to the same type of horizontally and vertically pivoted tone arm structure as in the preceding example, in the forward end of the tone arm 52, a suitable light-weight pickup or pickup cartridge 53 is mounted for independent vertical pivotal movement. It is provided with a forwardly extending stylus 54 having a stylus tip 55 for engaging the playing groove of the record at a level indicated by the dot-and-dash line 56, with the tone arm in the playing position. The pickup is mounted on or attached to the stub end of a lower branch 58 of a unitary U-shaped plastic tone arm support or bracket element 60. This element which thus serves also as a pickup bracket, further extends, at its upper branch, forwardly and downwardly within the tone arm cavity to provide an outer end 61 as a foot element for supporting the tone arm on the record surface. Like the preceding modification, the foot is provided with a pad 62 of soft material which slidably rests directly on the record surface. The bracket element is secured to the tone arm by suitable means, such as bolts 64 and 65 threaded into corresponding bosses as in the preceding example. Thin washers, of which one 66 is indicated in FIGURE 5, are provided for holding the bracket elements in place between the bosses.

The inner portion of the bracket element includes a pivot or hinge section 68 to which the pickup device 53 is connected for pivotal movement toward and away from the record surface in a vertical direction or plane at the stylus, as in the preceding example. However, in the present example, the pivot or hinge 68 is self-contained in the bracket means or element and is provided by a thin web between the stub end 58 and the body of the bracket 60 in the lower branch or arm of the U-shaped structure. This construction, as clearly shown, provides a hinge-type pivot means which is flexible and responsive in bringing the pickup stylus 55 into engagement with the record groove by gravity, while at the same time the pickup is easily retractable as in the preceding example, for the protection of the stylus tip.

The combined tone-arm and pickup bracket 60 of the present example may be constructed of any suitable flexible material, such as a plastic material known commercially as polypropylene. The inwardly extending foot 61 provides a stop which prevents the pickup element from falling below the level of the tone arm when it is raised off the record. The pad or foot element 62, and likewise the element 35 of the preceding example, may be made of any suitable soft material such as Dacron or wool felt, velveteen, or polyurethane foam, for example.

In each of the examples shown, the maximum pressure applicable to the stylus tip is provided by the pivotal pickup element per se. The tone-arm pressure is controlled by the bracket element for the tone arm and the supporting pad connected therewith which applies any excess downward pressure on the tone arm, by accident or otherwise, to the record surface and without applying excess force to the stylus or harming the stylus tip. Since the bracket foot is padded, no damage is applied to the record itself. In addition, the pickup suspension system of the present invention is more rugged, and due to the simplicity of construction, with a minimum number of parts, it is relatively low in cost.

In a commercial form of the invention, as shown more particularly in FIGURES 6 and 7, to which attention is now directed, the forward or pivotly movable end of a tone arm 70 is provided with a tone arm support means and a pickup mounting means or bracket assembly in two distinct structures within the tone arm. The tone arm support means or element 71 also is a pad retainer and is of plastic material which is pressed upwardly into the forward end of the tone arm cavity 72 to a seated position as indicated. In the present example it is in the form of a rectangular block having a lower integral foot element 73 in which the pad 74 is fitted for riding on the record surface indicated by the dash-and-dot line 75.

The tone arm support element and pad retainer 71 also carries a bent flat-strip pickup damping spring 76 which is retained between the element 71 and the inner wall of the tone arm, as indicated in the figure. The spring 76 is thus extended rearwardly of the support element 71 to a base strip or body portion 77 having a pair of tabs extending therefrom around the support element 71 as indicated by the single tab 78 in FIGURE 6. The pickup damping spring 76 lightly engages the forward movable end of the pickup cartridge 79 to stabilize vertical vibrations in certain equipment. The cartridge 79 is pivoted at its inner or rear end on a pivot pin 80 which seats at its ends in opposed bosses 81 on the inner walls of the tone arm. The pivot pin extends transversely across the tone arm as shown between the bosses and is seated therein in a fixed position. The pivot pin 81 is pressed into the tone arm through open slots 82 extending from the bottom of the tone arm upwardly into the bosses to provide a seat for the pin at each end thereof. In doing this, the lower edges of the tone arm are spread slightly, and the pin is thus retained in a position by a frictional fit in the slots.

The pickup bracket is of a U-shaped cross section comprising a shield plate 83 and integral flanges 84 on either side thereof extending downwardly when mounted in position in the tone arm. The pivot shaft 80 extends through bearing openings in the downwardly extending flanges as indicated and the pickup or pickup device 79 is mounted within the bracket and between the flanged sides thereof, with the forward end in light sliding contact with the damper spring 76 and with the stylus 85 extending downwardly therefrom to position the stylus tip 86 in the record groove. The tone arm also is provided with a metallic top escutcheon plate 88 mounted therein as indicated. This may be of any suitable material for ornamental purposes, such as a light metal for example.

As in the preceding examples, a pivoted tone arm has mounted therein a tone-arm support or bracket element having an outer end extending therefrom to engage and rest on the record surface. In the present example the tone-arm support or element is inserted in the forward end of the arm and serves to carry the pad 74 as a retainer therefor and to carry a damper spring for the pickup and to hold it in position for operation against the forward end of the pickup case or cartridge, thereby to damp vertical vibrations or resonance effects. The stylus is free of vertical pressure normally required to support the tone arm and can thus respond more faithfully to the record groove recording. The pivot or hinge construction is greatly simplified since it comprises a single piece or pin having substantially pointed ends. These seat in slots in the tone arm which may be of plastic material. The flanged pickup carrier is readily adapted for receiving the pivot pin through suitable aligned openings in the flanges.

The tone arm is thus provided with a stiff depending front end bracket or support element having a padded lower end or foot of limited area adapted to engage and ride on the record surface with the pickup and arm in the record playing position. The tone arm forward or free end thus remains substantially fixed in vertical spaced relation to the record surface and follows vertical undulations therein due to warpage, for example, as the pickup stylus does likewise at the same time in following the record groove in that surface. Thus relative vertical movement between the stylus tip 86 and the pickup pivot axis provided by the pivot shaft 80 in the tone arm is reduced to substantially zero, thereby reducing longitudinal movement in the groove and resultant wow and like distortion effects. The pickup bracket assembly falls by gravity until the stylus tip 86 contacts the record groove and any excess pressure applied to or received from the tone arm downwardly is prevented from reaching the stylus tip by the tone-arm support 71–74. Like the construction shown in the preceding example, the tone-arm support also provides an extension or stop element beneath the forward end of the pickup device to limit its movement downwardly when the tone arm is lifted from the record.

From the foregoing description it will be seen that an improved suspension system for phonograph pickups and like transducer elements in accordance with the invention, (1) effectively reduces distortion when operating with warped or other irregular flat disc records, and (2) limits the maximum vertical or downward force that may be applied to the pickup stylus as a protection therefor in operation. Also by maintaining the tone arm in fixed relation to the record surface, it is then independent of the height of the stack of records on the turntable.

What is claimed is:

1. In a phonograph record player, the combination with a pivoted tone arm laterally and vertically movable at its free end over an associated record turn-table, of a pickup device having a casing and a stylus extending therefrom for engaging the sound groove of a record on the turntable, a unitary tone-arm bracket element of plastic material mounted in and connected to said tone arm and having a padded foot extending from said free end to engage and slidably rest on the upper surface of said record on the turn-table to provide the sole support for the free end of said tone arm, thereby to hold said tone arm in substantially fixed spaced relation to said record surface, and means including a section of said bracket element providing an inner pivot hinge to which said pickup casing is connected for pivotal movement toward and away from the record surface in a vertical direction at the stylus, whereby the stylus is protected from vertical pressure applied by or through said tone arm while being movable therewith in substantially fixed spaced relation to said pivot hinge in response to vertical undulations in the record surface due to warpage.

2. In a phonograph record player, the combination with a pivoted tone arm laterally and vertically movable at one end over a record turn-table, of a pickup device in the movable end of said arm and having a stylus for engaging the sound groove of a record on the turntable, a combined pickup and tone-arm bracket element of plastic material mounted in said tone arm and having a padded foot extending therefrom to engage and rest on the upper surface of said record in operation to provide the sole support for said one end of said tone arm and thereby to hold said tone arm in substantially fixed spaced relation to said record surface, said bracket element being of unitary U-shape having an elongated upper branch and a stub lower branch to which said pickup is connected, and means including a relatively-thin web section in said lower branch providing an inner pivot hinge for pivotal movement of said pickup toward and away from the record surface in a vertical direction at the stylus, whereby the stylus is free of pressure from said tone arm in operation while maintaining a substantially fixed vertical relation to said pivot hinge in response to vertical undulations in the record surface due to warpage.

References Cited by the Examiner

UNITED STATES PATENTS

| | | | |
|---|---|---|---|
| 2,485,137 | 10/1949 | Brown | 274—24 |
| 2,572,712 | 10/1951 | Fisher | 274—24 |
| 2,643,886 | 6/1953 | Di Ghilini et al. | 274—24 |
| 3,074,726 | 1/1963 | Sioles et al. | 274—23 |

FOREIGN PATENTS

| | | |
|---|---|---|
| 260,626 | 4/1949 | Switzerland. |

OTHER REFERENCES

Electroacustic (German publ. appl.) 1,119,536 December 1961.

NORTON ANSHER, *Primary Examiner.*

EVON C. BLUNK, *Examiner.*